US011823460B2

(12) United States Patent
Wang et al.

(10) Patent No.: US 11,823,460 B2
(45) Date of Patent: Nov. 21, 2023

(54) IMAGE FUSION FOR AUTONOMOUS VEHICLE OPERATION

(71) Applicant: TUSIMPLE, INC., San Diego, CA (US)

(72) Inventors: Yijie Wang, San Diego, CA (US); Siyuan Liu, San Diego, CA (US); Lingting Ge, San Diego, CA (US); Zehua Huang, San Diego, CA (US)

(73) Assignee: TUSIMPLE, INC., San Diego, CA (US)

( * ) Notice: Subject to any disclaimer, the term of this patent is extended or adjusted under 35 U.S.C. 154(b) by 816 days.

(21) Appl. No.: 16/442,182

(22) Filed: Jun. 14, 2019

(65) Prior Publication Data

US 2020/0393845 A1    Dec. 17, 2020

(51) Int. Cl.
*G06V 20/56*   (2022.01)
*G06T 7/30*   (2017.01)
(Continued)

(52) U.S. Cl.
CPC ............ *G06V 20/56* (2022.01); *B60R 1/00* (2013.01); *G05D 1/0246* (2013.01); *G06T 7/30* (2017.01);
(Continued)

(58) Field of Classification Search
CPC ............ G05D 1/0246; G06K 9/00825; G06K 9/6289; G06K 9/6293; G06K 9/00791;
(Continued)

(56) References Cited

U.S. PATENT DOCUMENTS 6,084,870 A    7/2000   Wooten et al.
6,263,088 B1   7/2001   Crabtree
(Continued)

FOREIGN PATENT DOCUMENTS

CN    106340197 A    1/2017
CN    106781591 A    5/2017
(Continued)

OTHER PUBLICATIONS

Carle, Patrick J.F. et al. "Global Rover Localization by Matching Lidar and Orbital 3D Maps." IEEE, Anchorage Convention District, pp. 1-6, May 3-8, 2010. (Anchorage Alaska, US).
(Continued)

*Primary Examiner* — Maceeh Anwari
(74) *Attorney, Agent, or Firm* — Paul Liu; Glenn Theodore Mathews; Perkins Coie, LLP

(57) ABSTRACT

Devices, systems and methods for fusing scenes from real-time image feeds from on-vehicle cameras in autonomous vehicles to reduce redundancy of the information processed to enable real-time autonomous operation are described. One example of a method for improving perception in an autonomous vehicle includes receiving a plurality of cropped images, wherein each of the plurality of cropped images comprises one or more bounding boxes that correspond to one or more objects in a corresponding cropped image; identifying, based on the metadata in the plurality of cropped images, a first bounding box in a first cropped image and a second bounding box in a second cropped image, wherein the first and second bounding boxes correspond to a common object; and fusing the metadata corresponding to the common object from the first cropped image and the second cropped image to generate an output result for the common object.

20 Claims, 8 Drawing Sheets

(51) Int. Cl.
*B60R 1/00* (2022.01)
*G05D 1/02* (2020.01)
*G06V 20/58* (2022.01)
*G06V 10/80* (2022.01)

(52) U.S. Cl.
CPC .......... *G06V 10/803* (2022.01); *G06V 10/811* (2022.01); *G06V 20/584* (2022.01); *B60R 2300/303* (2013.01); *G05D 2201/0213* (2013.01)

(58) Field of Classification Search
CPC ............. G06K 9/6288; G06K 2209/23; G06K 9/00805; B60R 2300/303; B60R 2300/30; B60R 2300/304; B60R 2300/307; G06T 7/30
USPC ........................................................ 701/23
See application file for complete search history.

(56) References Cited

U.S. PATENT DOCUMENTS

| | | |
|---|---|---|
| 6,594,821 B1 | 7/2003 | Banning et al. |
| 6,777,904 B1 | 8/2004 | Degner |
| 6,975,923 B2 | 12/2005 | Spriggs |
| 7,103,460 B1 | 9/2006 | Breed |
| 7,689,559 B2 | 3/2010 | Canright |
| 7,742,841 B2 | 6/2010 | Sakai et al. |
| 7,783,403 B2 | 8/2010 | Breed |
| 7,844,595 B2 | 11/2010 | Canright |
| 8,041,111 B1 | 10/2011 | Wilensky |
| 8,064,643 B2 | 11/2011 | Stein |
| 8,082,101 B2 | 12/2011 | Stein |
| 8,164,628 B2 | 4/2012 | Stein |
| 8,175,376 B2 | 5/2012 | Marchesotti |
| 8,271,871 B2 | 9/2012 | Marchesotti |
| 8,346,480 B2 | 1/2013 | Trepagnier et al. |
| 8,378,851 B2 | 2/2013 | Stein |
| 8,392,117 B2 | 3/2013 | Dolgov |
| 8,401,292 B2 | 3/2013 | Park |
| 8,412,449 B2 | 4/2013 | Trepagnier |
| 8,478,072 B2 | 7/2013 | Aisaka |
| 8,553,088 B2 | 10/2013 | Stein |
| 8,706,394 B2 | 4/2014 | Trepagnier et al. |
| 8,718,861 B1 | 5/2014 | Montemerlo et al. |
| 8,788,134 B1 | 7/2014 | Litkouhi |
| 8,908,041 B2 | 12/2014 | Stein |
| 8,917,169 B2 | 12/2014 | Schofield |
| 8,963,913 B2 | 2/2015 | Baek |
| 8,965,621 B1 | 2/2015 | Urmson |
| 8,981,966 B2 | 3/2015 | Stein |
| 8,983,708 B2 | 3/2015 | Choe et al. |
| 8,993,951 B2 | 3/2015 | Schofield |
| 9,002,632 B1 | 4/2015 | Emigh |
| 9,008,369 B2 | 4/2015 | Schofield |
| 9,025,880 B2 | 5/2015 | Perazzi |
| 9,042,648 B2 | 5/2015 | Wang |
| 9,081,385 B1 | 7/2015 | Ferguson et al. |
| 9,088,744 B2 | 7/2015 | Grauer et al. |
| 9,111,444 B2 | 8/2015 | Kaganovich |
| 9,117,133 B2 | 8/2015 | Barnes |
| 9,118,816 B2 | 8/2015 | Stein |
| 9,120,485 B1 | 9/2015 | Dolgov |
| 9,122,954 B2 | 9/2015 | Srebnik |
| 9,134,402 B2 | 9/2015 | Sebastian |
| 9,145,116 B2 | 9/2015 | Clarke |
| 9,147,255 B1 | 9/2015 | Zhang |
| 9,156,473 B2 | 10/2015 | Clarke |
| 9,176,006 B2 | 11/2015 | Stein |
| 9,179,072 B2 | 11/2015 | Stein |
| 9,183,447 B1 | 11/2015 | Gdalyahu |
| 9,185,360 B2 | 11/2015 | Stein |
| 9,191,634 B2 | 11/2015 | Schofield |
| 9,214,084 B2 | 12/2015 | Grauer et al. |
| 9,219,873 B2 | 12/2015 | Grauer et al. |
| 9,233,659 B2 | 1/2016 | Rosenbaum |
| 9,233,688 B2 | 1/2016 | Clarke |
| 9,248,832 B2 | 2/2016 | Huberman |
| 9,248,835 B2 | 2/2016 | Tanzmeister |
| 9,251,708 B2 | 2/2016 | Rosenbaum |
| 9,277,132 B2 | 3/2016 | Berberian |
| 9,280,711 B2 | 3/2016 | Stein |
| 9,282,144 B2 | 3/2016 | Tebay et al. |
| 9,286,522 B2 | 3/2016 | Stein |
| 9,297,641 B2 | 3/2016 | Stein |
| 9,299,004 B2 | 3/2016 | Lin |
| 9,315,192 B1 | 4/2016 | Zhu |
| 9,317,033 B2 | 4/2016 | Ibanez-Guzman et al. |
| 9,317,776 B1 | 4/2016 | Honda |
| 9,330,334 B2 | 5/2016 | Lin |
| 9,342,074 B2 | 5/2016 | Dolgov |
| 9,347,779 B1 | 5/2016 | Lynch |
| 9,355,635 B2 | 5/2016 | Gao |
| 9,365,214 B2 | 6/2016 | Ben Shalom |
| 9,399,397 B2 | 7/2016 | Mizutani |
| 9,418,549 B2 | 8/2016 | Kang et al. |
| 9,428,192 B2 | 8/2016 | Schofield |
| 9,436,880 B2 | 9/2016 | Bos |
| 9,438,878 B2 | 9/2016 | Niebla |
| 9,443,163 B2 | 9/2016 | Springer |
| 9,446,765 B2 | 9/2016 | Ben Shalom |
| 9,459,515 B2 | 10/2016 | Stein |
| 9,466,006 B2 | 10/2016 | Duan |
| 9,476,970 B1 | 10/2016 | Fairfield |
| 9,483,839 B1 | 11/2016 | Kwon |
| 9,490,064 B2 | 11/2016 | Hirosawa |
| 9,494,935 B2 | 11/2016 | Okumura et al. |
| 9,507,346 B1 | 11/2016 | Levinson et al. |
| 9,513,634 B2 | 12/2016 | Pack et al. |
| 9,531,966 B2 | 12/2016 | Stein |
| 9,535,423 B1 | 1/2017 | Debreczeni |
| 9,538,113 B2 | 1/2017 | Grauer et al. |
| 9,547,985 B2 | 1/2017 | Tuukkanen |
| 9,549,158 B2 | 1/2017 | Grauer et al. |
| 9,555,803 B2 | 1/2017 | Pawlicki |
| 9,568,915 B1 | 2/2017 | Berntorp |
| 9,587,952 B1 | 3/2017 | Slusar |
| 9,599,712 B2 | 3/2017 | Van Der Tempel et al. |
| 9,600,889 B2 | 3/2017 | Boisson et al. |
| 9,602,807 B2 | 3/2017 | Crane et al. |
| 9,612,123 B1 | 4/2017 | Levinson et al. |
| 9,620,010 B2 | 4/2017 | Grauer et al. |
| 9,625,569 B2 | 4/2017 | Lange |
| 9,628,565 B2 | 4/2017 | Stenneth et al. |
| 9,649,999 B1 | 5/2017 | Amireddy et al. |
| 9,652,860 B1 | 5/2017 | Maali |
| 9,669,827 B1 | 6/2017 | Ferguson et al. |
| 9,672,446 B1 | 6/2017 | Vallesi-Gonzalez |
| 9,690,290 B2 | 6/2017 | Prokhorov |
| 9,701,023 B2 | 7/2017 | Zhang et al. |
| 9,712,754 B2 | 7/2017 | Grauer et al. |
| 9,720,418 B2 | 8/2017 | Stenneth |
| 9,723,097 B2 | 8/2017 | Harris |
| 9,723,099 B2 | 8/2017 | Chen |
| 9,723,233 B2 | 8/2017 | Grauer et al. |
| 9,726,754 B2 | 8/2017 | Massanell et al. |
| 9,729,860 B2 | 8/2017 | Cohen et al. |
| 9,738,280 B2 | 8/2017 | Rayes |
| 9,739,609 B1 | 8/2017 | Lewis |
| 9,746,550 B2 | 8/2017 | Nath |
| 9,753,128 B2 | 9/2017 | Schweizer et al. |
| 9,753,141 B2 | 9/2017 | Grauer et al. |
| 9,754,490 B2 | 9/2017 | Kentley et al. |
| 9,760,837 B1 | 9/2017 | Nowozin et al. |
| 9,766,625 B2 | 9/2017 | Boroditsky et al. |
| 9,769,456 B2 | 9/2017 | You et al. |
| 9,773,155 B2 | 9/2017 | Shotton et al. |
| 9,779,276 B2 | 10/2017 | Todeschini et al. |
| 9,785,149 B2 | 10/2017 | Wang et al. |
| 9,805,294 B2 | 10/2017 | Liu et al. |
| 9,810,785 B2 | 11/2017 | Grauer et al. |
| 9,823,339 B2 | 11/2017 | Cohen |
| 9,953,236 B1 | 4/2018 | Huang |
| 10,147,193 B2 | 12/2018 | Huang |

(56) References Cited

U.S. PATENT DOCUMENTS

| | | |
|---|---|---|
| 10,223,806 B1 | 3/2019 | Yi et al. |
| 10,223,807 B1 | 3/2019 | Yi et al. |
| 10,410,055 B2 | 9/2019 | Wang et al. |
| 2003/0114980 A1 | 6/2003 | Klausner et al. |
| 2003/0174773 A1 | 9/2003 | Comaniciu |
| 2004/0264763 A1 | 12/2004 | Mas et al. |
| 2007/0183661 A1 | 8/2007 | El-Maleh |
| 2007/0183662 A1 | 8/2007 | Wang |
| 2007/0230792 A1 | 10/2007 | Shashua |
| 2007/0286526 A1 | 12/2007 | Abousleman |
| 2008/0249667 A1 | 10/2008 | Horvitz |
| 2009/0040054 A1 | 2/2009 | Wang |
| 2009/0087029 A1 | 4/2009 | Coleman |
| 2010/0049397 A1 | 2/2010 | Lin |
| 2010/0111417 A1 | 5/2010 | Ward |
| 2010/0226564 A1 | 9/2010 | Marchesotti |
| 2010/0281361 A1 | 11/2010 | Marchesotti |
| 2011/0142283 A1 | 6/2011 | Huang |
| 2011/0206282 A1 | 8/2011 | Aisaka |
| 2011/0247031 A1 | 10/2011 | Jacoby |
| 2012/0041636 A1 | 2/2012 | Johnson et al. |
| 2012/0105639 A1 | 5/2012 | Stein |
| 2012/0140076 A1 | 6/2012 | Rosenbaum |
| 2012/0274629 A1 | 11/2012 | Baek |
| 2012/0314070 A1 | 12/2012 | Zhang et al. |
| 2013/0051613 A1 | 2/2013 | Bobbitt et al. |
| 2013/0083959 A1 | 4/2013 | Owechko |
| 2013/0182134 A1 | 7/2013 | Grundmann et al. |
| 2013/0204465 A1 | 8/2013 | Phillips et al. |
| 2013/0266187 A1 | 10/2013 | Bulan |
| 2013/0329052 A1 | 12/2013 | Chew |
| 2014/0072170 A1 | 3/2014 | Zhang |
| 2014/0104051 A1 | 4/2014 | Breed |
| 2014/0142799 A1 | 5/2014 | Ferguson et al. |
| 2014/0143839 A1 | 5/2014 | Ricci |
| 2014/0145516 A1 | 5/2014 | Hirosawa |
| 2014/0198184 A1 | 7/2014 | Stein |
| 2014/0321704 A1 | 10/2014 | Partis |
| 2014/0334668 A1 | 11/2014 | Saund |
| 2015/0062304 A1 | 3/2015 | Stein |
| 2015/0269438 A1 | 9/2015 | Samarsekera et al. |
| 2015/0310370 A1 | 10/2015 | Burry |
| 2015/0353082 A1 | 12/2015 | Lee et al. |
| 2016/0008988 A1 | 1/2016 | Kennedy |
| 2016/0026787 A1 | 1/2016 | Nairn et al. |
| 2016/0037064 A1 | 2/2016 | Stein |
| 2016/0094774 A1 | 3/2016 | Li |
| 2016/0118080 A1 | 4/2016 | Chen |
| 2016/0129907 A1 | 5/2016 | Kim |
| 2016/0165157 A1 | 6/2016 | Stein |
| 2016/0210528 A1 | 7/2016 | Duan |
| 2016/0275766 A1 | 9/2016 | Venetianer et al. |
| 2016/0321381 A1 | 11/2016 | English |
| 2016/0334230 A1 | 11/2016 | Ross et al. |
| 2016/0342837 A1 | 11/2016 | Hong et al. |
| 2016/0347322 A1 | 12/2016 | Clarke et al. |
| 2016/0375907 A1 | 12/2016 | Erban |
| 2017/0053169 A1 | 2/2017 | Cuban et al. |
| 2017/0061632 A1 | 3/2017 | Linder et al. |
| 2017/0103270 A1* | 4/2017 | Reiff ................... B60T 7/22 |
| 2017/0124476 A1 | 5/2017 | Levinson et al. |
| 2017/0134631 A1 | 5/2017 | Zhao et al. |
| 2017/0177951 A1 | 6/2017 | Yang et al. |
| 2017/0301104 A1 | 10/2017 | Qian |
| 2017/0305423 A1 | 10/2017 | Green |
| 2017/0318407 A1 | 11/2017 | Meister |
| 2017/0336203 A1* | 11/2017 | Barnes ................ G01S 17/88 |
| 2018/0151063 A1 | 5/2018 | Pun |
| 2018/0158197 A1 | 6/2018 | Dasgupta |
| 2018/0260956 A1 | 9/2018 | Huang |
| 2018/0283892 A1 | 10/2018 | Behrendt |
| 2018/0373980 A1 | 12/2018 | Huval |
| 2019/0025853 A1 | 1/2019 | Julian |
| 2019/0026923 A1* | 1/2019 | Shinya ................. G06T 7/80 |
| 2019/0065863 A1 | 2/2019 | Luo et al. |
| 2019/0066329 A1 | 2/2019 | Yi et al. |
| 2019/0066330 A1 | 2/2019 | Yi et al. |
| 2019/0066344 A1 | 2/2019 | Yi et al. |
| 2019/0108384 A1 | 4/2019 | Wang et al. |
| 2019/0132391 A1 | 5/2019 | Thomas |
| 2019/0132392 A1 | 5/2019 | Liu |
| 2019/0210564 A1 | 7/2019 | Han |
| 2019/0210613 A1 | 7/2019 | Sun |
| 2019/0236950 A1 | 8/2019 | Li |
| 2019/0266420 A1 | 8/2019 | Ge |
| 2019/0286916 A1* | 9/2019 | Yan ..................... G06T 3/0093 |
| 2019/0354786 A1* | 11/2019 | Lee ..................... G05D 1/0088 |

FOREIGN PATENT DOCUMENTS

| | | |
|---|---|---|
| CN | 108010360 A | 5/2018 |
| EP | 890470 B1 | 1/1999 |
| EP | 1754179 A1 | 2/2007 |
| EP | 2448251 A2 | 5/2012 |
| EP | 2463843 A2 | 6/2012 |
| EP | 2761249 A1 | 8/2014 |
| EP | 2946336 A2 | 11/2015 |
| EP | 2993654 A1 | 3/2016 |
| EP | 3081419 A1 | 10/2016 |
| KR | 100802511 A1 | 2/2008 |
| WO | 1991009375 A1 | 6/1991 |
| WO | 2005098739 A1 | 10/2005 |
| WO | 2005098751 A1 | 10/2005 |
| WO | 2005098782 A1 | 10/2005 |
| WO | 2010109419 A | 9/2010 |
| WO | 2013045612 A1 | 4/2013 |
| WO | 2014111814 A2 | 7/2014 |
| WO | 2014166245 A1 | 10/2014 |
| WO | 2014201324 A1 | 12/2014 |
| WO | 2015083009 A1 | 6/2015 |
| WO | 2015103159 A1 | 7/2015 |
| WO | 2015125022 A2 | 8/2015 |
| WO | 2015186002 A2 | 12/2015 |
| WO | 2016090282 A1 | 6/2016 |
| WO | 2016135736 A2 | 9/2016 |
| WO | 2017079349 A1 | 5/2017 |
| WO | 2017079460 A2 | 5/2017 |
| WO | 2017013875 A1 | 5/2018 |

OTHER PUBLICATIONS

Caselitz, T. et al., "Monocular camera localization in 3D LiDAR maps," European Conference on Computer Vision (2014) Computer Vision—ECCV 2014. ECCV 2014. Lecture Notes in Computer Science, vol. 8690. Springer, Cham. (pp. 1-6).

Mur-Artal, R. et al., "ORB-SLAM: A Versatile and Accurate Monocular SLAM System," IEEE Transaction on Robotics, Oct. 2015, pp. 1147-1163, vol. 31, No. 5, Spain.

Sattler, T. et al., "Are Large-Scale 3D Models Really Necessary for Accurate Visual Localization?" CVPR, IEEE, 2017, pp. 1-10.

Engel, J. et la. "LSD-SLAM: Large Scare Direct Monocular SLAM," pp. 1-16, (2014) Munich.

Levinson, Jesse et al., Experimental Robotics, Unsupervised Calibration for Multi-Beam Lasers, pp. 179-194, 12th Ed., Oussama Khatib, Vijay Kumar, Gaurav Sukhatme (Eds.) Springer-Verlag Berlin Heidelberg 2014.

Geiger, Andreas et al., "Automatic Camera and Range Sensor Calibration using a single Shot", Robotics and Automation (ICRA), pp. 1-8, 2012 IEEE International Conference.

Zhang, Z. et al. A Flexible new technique for camera calibration. IEEE Transactions on Pattern Analysis and Machine Intelligence (vol. 22, Issue: 11, Nov. 2000), pp. 1-5.

Bar-Hillel, Aharon et al. "Recent progress in road and lane detection: a survey." Machine Vision and Applications 25 (2011): 727-745, pp. 1-20.

Schindler, Andreas et al. "Generation of high precision digital maps using circular arc splines," 2012 IEEE Intelligent Vehicles Symposium, Alcala de Henares, 2012, pp. 246-251. doi: 10.1109/IVS. 2012.6232124.

(56) References Cited

OTHER PUBLICATIONS

Hou, Xiaodi et. al., "Saliency Detection: A Spectral Residual Approach", Computer Vision and Pattern Recognition, CVPR'07—IEEE Conference, pp. 1-8, 2007.
Hou, Xiaodi et al., "Image Signature: Highlighting Sparse Salient Regions", IEEE Transactions on Pattern Analysis and Machine Intelligence, vol. 34, No. 1, pp. 194-201, 2012.
Hou, Xiaodi et al., "Dynamic Visual Attention: Searching For Coding Length Increments", Advances in Neural Information Processing Systems, vol. 21, pp. 681-688, 2008.
Li, Yin et al., "The Secrets of Salient Object Segmentation", Proceedings of the IEEE Conference on Computer Vision and Pattern Recognition, pp. 280-287, 2014.
Zhou, Bolei et al., "A Phase Discrepancy Analysis of Object Motion", Asian Conference on Computer Vision, pp. 225-238, Springer Berlin Heidelberg, 2010.
Hou, Xiaodi et al., "Boundary Detection Benchmarking: Beyond F-Measures", Computer Vision and Pattern Recognition, CVPR'13, vol. 2013, pp. 1-8, IEEE, 2013.
Hou, Xiaodi et al., "Color Conceptualization", Proceedings of the 15th ACM International Conference on Multimedia, pp. 265-268, ACM, 2007.
Hou, Xiaodi et al., "Thumbnail Generation Based on Global Saliency", Advances in Cognitive Neurodynamics, ICCN 2007, pp. 999-1003, Springer Netherlands, 2008.
Hou, Xiaodi et al., "A Meta-Theory of Boundary Detection Benchmarks", arXiv preprint arXiv:1302.5985, pp. 1-4, Feb. 25, 2013.
Li, Yanghao et al., "Revisiting Batch Normalization for Practical Domain Adaptation", arXiv preprint arXiv:1603.04779, pp. 1-12, Nov. 8, 2016.
Li, Yanghao et al., "Demystifying Neural Style Transfer", arXiv preprint arXiv:1701.01036, pp. 1-8, Jan. 4, 2017.
Hou, Xiaodi et al., "A Time-Dependent Model of Information Capacity of Visual Attention", International Conference on Neural Information Processing, pp. 127-136, Springer Berlin Heidelberg, 2006.
Wang, Panqu et al., "Understanding Convolution for Semantic Segmentation", arXiv preprint arXiv:1702.08502, pp. 1-10, Feb. 27, 2017.
Li, Yanghao, et al., "Factorized Bilinear Models for Image Recognition", arXiv preprint arXiv:1611.05709, pp. 1-9, Nov. 17, 2016.
Hou, Xiaodi, "Computational Modeling and Psychophysics in Low and Mid-Level Vision", California Institute of Technology, pp. 1-125, May 7, 2014.
Spinello, Luciano, et al., "Multiclass Multimodal Detection and Tracking in Urban Environments", Sage Journals, vol. 29 Issue 12, pp. 1498-1515 Article first published online: Oct. 7, 2010; Issue published: Oct. 1, 2010.
Barth, Matthew Barth, et al., "Recent Validation Efforts for a Comprehensive Modal Emissions Model", Transportation Research Record 1750, Paper No. 01-0326, College of Engineering, Center for Environmental Research and Technology, University of California, Riverside, CA 92521, Jan. 1, 2001, pp. 1-11.
Ramos, Sebastian, et al., "Detecting Unexpected Obstacles for Self-Driving Cars: Fusing Deep Learning and Geometric Modeling", arXiv:1612.06573v1 [cs.CV] pp. 1-8, Dec. 20, 2016.
Schroff, Florian, et al., "FaceNet: A Unified Embedding for Face Recognition and Clustering", CVPR, pp. 1-10, Jun. 17, 2015.
Dai, Jifeng, et al., (Microsoft Research), "Instance-aware Semantic Segmentation via Multi-task Network Cascades", CVPR, pp. 1-1, Dec. 14, 2016.
Huval, Brody, et al., "An Empirical Evaluation of Deep Learning on Highway Driving", arXiv:1504.01716v3 [cs.RO], pp. 1-7, Apr. 17, 2015.
Li, Tian, "Proposal Free Instance Segmentation Based on Instance-aware Metric", Department of Computer Science, Cranberry-Lemon University, Pittsburgh, PA., date unknown, pp. 1-2.
Norouzi, Mohammad, et al., "Hamming Distance Metric Learning", Departments of Computer Science and Statistics, University of Toronto, pp. 1-9, Dec. 1, 2012.
Jain, Suyong Dutt, et al., "Active Image Segmentation Propagation", In Proceedings of the IEEE Conference on Computer Vision and Pattern Recognition (CVPR), Las Vegas, pp. 1-10, Jun. 2016.
Macaodha, Oisin, et al., "Hierarchical Subquery Evaluation for Active Learning on a Graph", In Proceedings of the IEEE Conference on Computer Vision and Pattern Recognition (CVPR), pp. 1-8, 2014.
Kendall, Alex, et al., "What Uncertainties Do We Need in Bayesian Deep Learning for Computer Vision", arXiv:1703.04977v1 [cs.CV], pp. 1-11, Mar. 15, 2017.
Wei, Junqing, et al., "A Prediction- and Cost Function-Based Algorithm for Robust Autonomous Freeway Driving", 2010 IEEE Intelligent Vehicles Symposium, University of California, San Diego, CA, USA, pp. 1-6, Jun. 21-24, 2010.
Welinder, Peter et al., "The Multidimensional Wisdom of Crowds"; http://www.vision.caltech.edu/visipedia/papers/WelinderEtalNIPS10.pdf, pp. 1-9, 2010.
Yu, Kai et al., "A Large-scale Distributed Video Parsing and Evaluation Platform", Center for Research on Intelligent Perception and Computing, Institute of Automation, Chinese Academy of Sciences, China, arXiv:1611.09580v1 [cs.CV] Nov. 29, 2016, pp. 1-7.
Guarneri, Paolo et al., "A Neural-Network-Based Model for the Dynamic Simulation of the Tire/Suspension System While Traversing Road Irregularities," in IEEE Transactions on Neural Networks, vol. 19, No. 9, pp. 1549-1563, Sep. 2008.
Yang, Chenguang et al., "Neural Network-Based Motion Control of an Underactuated Wheeled Inverted Pendulum Model," in IEEE Transactions on Neural Networks and Learning Systems, vol. 25, No. 11, pp. 2004-2016, Nov. 2014.
Richter, Stephan R., et al., "Playing for Data: Ground Truth from Computer Games", Intel Labs, European Conference on Computer Vision (ECCV), Amsterdam, the Netherlands, pp. 1-16, Aug. 7, 2016.
Athanasiadis, Thanos, et al., "Semantic Image Segmentation and Object Labeling", IEEE Transactions on Circuits and Systems for Video Technology, vol. 17, No. 3, pp. 298-312, Mar. 2007.
Cordts, Marius et al., "The Cityscapes Dataset for Semantic Urban Scene Understanding", Proceedings of the IEEE Computer Society Conference on Computer Vision and Pattern Recognition (CVPR), Las Vegas, Nevada, pp. 1-29, Apr. 7, 2016.
Somani, Adhiraj, et al., "DESPOT: Online POMDP Planning with Regularization", Department of Computer Science, National University of Singapore, date unknown, pp. 1-9.
Paszke, Adam et al., "Enet: A deep neural network architecture for real-time semantic segmentation." CoRR, (abs/1606.02147) pp. 1-10, 2016.
Szeliski, Richard, "Computer Vision: Algorithms and Applications" http://szeliski.org/Book/, pp. 1-2, 2010.
Ahn, Kyoungho et al., "The Effects of Route Choice Decisions on Vehicle Energy Consumption and Emissions", Virginia Tech Transportation Institute, pp. 1-34, May 2008.
Grigoerescu, Simona, European Application No. 20178069, Extended European Search Report dated Feb. 10, 2021, pp. 1-9.
Akshay Uttama Nambi, et al. "FarSight", Proceedings of the ACM on Interactive, Mobile, Wearable and Ubiquitous Technologies, ACM, 2 Penn Plaza, Suite 701, New York, NY 10121-0701USA, vol. 2, No. 4, pp. 1-22, Dec. 27, 2018.
Bertozzi, Massimo et al., "360 Detection and tracking algorithm of both pedestrian and vehicle using fisheye images", IEEE Intelligent Vehicles Symposium (IV), IEEE, pp. 132-137, Jun. 28, 2015.
No Author. European Application No. 20178069-1207, Extended European Search Report dated Feb. 10, 2021, pp. 1-9.

* cited by examiner

IMAGE FUSION FOR AUTONOMOUS VEHICLE OPERATION

TECHNICAL FIELD

This document generally relates to image processing to improve autonomous vehicular driving.

BACKGROUND

Autonomous vehicle navigation is a technology for sensing the position and movement of a vehicle and, based on the sensing, autonomously control the vehicle to navigate towards a destination. Autonomous vehicle navigation can have important applications in transportation of people, goods and services. One of the components of autonomous driving, which ensures the safety of the vehicle and its passengers, as well as people and property in the vicinity of the vehicle, is the use of multiple cameras and the real-time responsiveness of the driving algorithms for safety and maneuvering.

SUMMARY

Disclosed are devices, systems and methods for fusing scenes from real-time image feeds from on-vehicle cameras in autonomous vehicles to reduce redundancy of the information processed to enable real-time autonomous operation. In one aspect, the disclosed technology can be used to provide a method for improving perception in an autonomous vehicle. This method includes receiving a plurality of cropped images, wherein each of the plurality of cropped images comprises one or more bounding boxes that correspond to one or more objects in a corresponding cropped image; identifying, based on the metadata in the plurality of cropped images, a first bounding box in a first cropped image and a second bounding box in a second cropped image, wherein the first and second bounding boxes correspond to a common object; and fusing the metadata corresponding to the common object from the first cropped image and the second cropped image to generate an output result for the common object.

In another aspect, the above-described method is embodied in the form of processor-executable code and stored in a computer-readable program medium.

In yet another aspect, a device that is configured or operable to perform the above-described method is disclosed. The device may include a processor that is programmed to implement this method.

The above and other aspects and features of the disclosed technology are described in greater detail in the drawings, the description and the claims.

DETAILED DESCRIPTION

The transportation industry has been undergoing considerable changes in the way technology is used to control the operation of the vehicles. As exemplified in the automotive passenger vehicle, there has been a general advancement towards shifting more of the operational and navigational decision making away from the human driving and into on-board computing power. This is exemplified in the extreme by the numerous under-development autonomous vehicles. Current implementations are in intermediate stages, such as the partially-autonomous operation in some vehicles (e.g., autonomous acceleration and navigation, but with the requirement of a present and attentive driver), the safety-protecting operation of some vehicles (e.g., maintaining a safe following distance and automatic braking), the safety-protecting warnings of some vehicles (e.g., blind-spot indicators in side-view mirrors and proximity sensors), as well as ease-of-use operations (e.g., autonomous parallel parking).

These different types of autonomous vehicles have been classified into different levels of automation by under the SAE International's J3016 standard, ranging from Level 0 in which the vehicle has no automation to Level 4 (L4), which is characterized by the vehicle operating without human input or oversight but only under select conditions defined by factors such as road type or geographic area, and Level 5 (L5), which is characterized as a driverless car that can operate on any road and in any environment a human driver could negotiate.

The differing levels of autonomy are typically supported by sensors or cameras that provides data or images of one or more areas surrounding the autonomous vehicle. A computer located in the conventional autonomous vehicle performs image processing to determine the presence or absence of objects (e.g., vehicles or pedestrians) within a limited range from the location of the autonomous vehicle. For example, using conventional techniques, a computer in an autonomous vehicle can perceive objects within a 300-meter distance from the location of the autonomous vehicle. However, a limited range of perception may not be sufficient if the autonomous vehicle is a semi-trailer truck. An autonomous semi-trailer truck is designed to drive safely on the road. However, in some cases, a limited range of perception (e.g., up to 300 meters) may not be sufficient to proactively detect an object on the road so that the autonomous semi-trailer truck may safely stop prior to colliding with or to safely maneuver around that object.

Section headings are used in the present document to improve readability of the description and do not in any way limit the discussion or the embodiments (and/or implementations) to the respective sections only.

Examples of a Long-Distance Perception System

Figure 1:
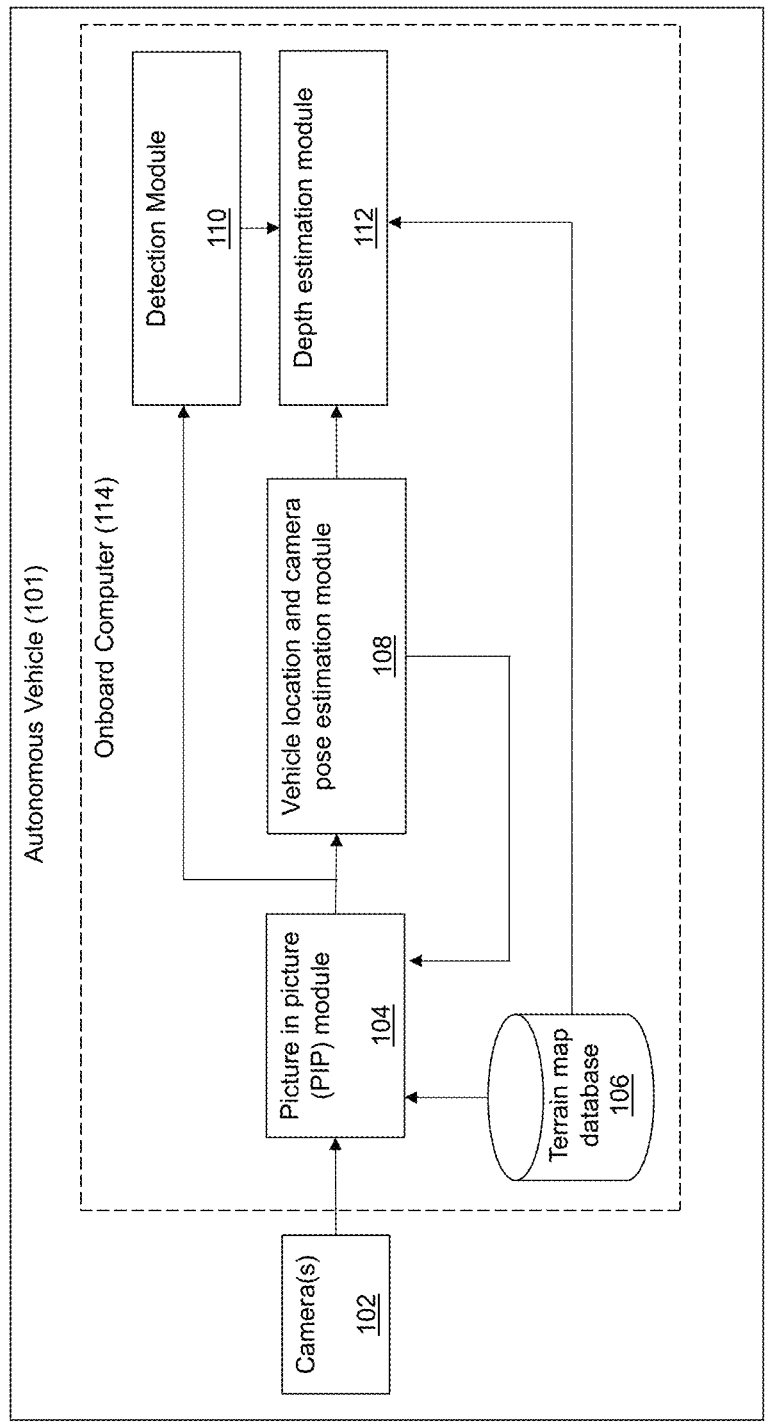
FIG. 1 shows a block diagram of an exemplary long-distance perception system to perform image processing on images obtained from multiple cameras of an autonomous vehicle.

FIG. 1 shows a block diagram of an exemplary long-distance perception system 100 to perform image processing on images obtained from one or more cameras 102 in or on an autonomous vehicle 101, such as an autonomous semi-trailer truck. The exemplary image processing techniques described in this patent document can be used to get an accurate three-dimension (3D) position of object located up to 1000 meters from the location of the autonomous vehicle 101. The exemplary image processing techniques can also be used to track and build motion models for each object perceived. Thus, the exemplary long-distance perception system 100 can be used to enhance safety of an autonomous vehicle 101 driven on the road.

Cameras, onboard computers and databases. In some embodiments, the long-distance perception system 100 includes one or more cameras 102 installed on or in an autonomous vehicle 101. Each camera 102 can generate high-resolution images in real-time while the autonomous vehicle 101 is in operation, such as driving on the road or stopping at a stop sign. In this patent document, the term image can include an image frame from a video feed of a camera 102. The resolution of an image frame from the one or more cameras 102 can be, for example, 1024×576 pixels. The one or more cameras 102 can obtain images at a speed of, for example, 20 frames per second (FPS).

FIG. 1 shows several modules and a database that can perform image processing based on the images received from the one or more cameras 102. The features or operations of the modules 104, 108, 110, 112 and terrain map database 106 are performed by an onboard computer 114 located in an autonomous vehicle 101. The onboard computer 114 located in the autonomous vehicle 101 includes at least one processor and a memory having instructions stored thereupon. The instructions upon execution by the processor configure the onboard computer 114 to perform the operations associated with the modules and/or database as described in this patent document.

In some embodiments, the terrain map database 106 may be stored in the onboard computer 114 and provides coordinates of various points in the spatial region (e.g., road surface or mountain elevation) where or around which the autonomous vehicle 101 is being driven or is located. The terrain map database 106 stores the terrain information that can be represented in 3D space or 3D world coordinates, where the coordinate information characterizes various points in the spatial region that surrounds the autonomous vehicle 101. For example, a terrain map database 106 can include 3D world coordinates for one or more points of a road surface on which the autonomous vehicle 101 is being driven. In another example, a terrain map database 106 can include 3D world coordinates for one or more points in a spatial region towards which or within which the autonomous vehicle 101 is being driven.

Image processing by the picture-in-picture module. In some embodiments, and as shown in FIG. 1, the onboard computer 114 on an autonomous vehicle can perform image processing to perceive objects (e.g., vehicles, pedestrians, obstacles) from information provided by sensors such as cameras. The picture-in-picture (PIP) module 104 can process the images obtained from the camera(s) 102 to improve perception of objects that can be located far from the location of the autonomous vehicle 101.

As shown in FIG. 1, the images obtained from each camera 102 is sent to a PIP module 104. As explained in this section, the PIP module 104 obtains an original image from a camera to select and crop one or more regions of interest in the image. Next, the PIP module 104 sends the cropped region(s) of interest in the image to one or more downstream modules as shown in FIG. 1, such as the detection module 110.

In an example, the PIP module 104 can select and crop one or more regions of interest in an image obtained from a camera 102. The region(s) selected by the PIP module 104 may include area(s) located in front of the autonomous vehicle (e.g., road, highway ramp, or intersection). The selected area(s) are either past a pre-determined distance in front of the location of the autonomous vehicle (e.g., past a distance of 500 meters in front) or are within a range of pre-determined distances in front of the location of the autonomous vehicle (e.g., between 500 meters to 1000 meters in front).

In another example, the PIP module 104 may select and crop region(s) of interest in one of several ways. Typically, the PIP module 104 can obtain information about a road in front of the autonomous vehicle to select its region(s) of interest. For example, if the PIP module 104 determines that the road is straight (e.g., by identifying the curvature or shape of the lane markers), then the PIP module 104 can select and crop a center region of the original image that includes a region of the road or highway ramp or intersection, where the center region has a pre-determined pixel resolution. In another example, the PIP module 104 can obtain coordinate information of points on the road from a terrain map database 106 so that whether the road is curved or straight the PIP module 104 can select and crop one or more regions of interest that include region(s) of the road or highway ramp or intersection. In both these examples, the selected and cropped region(s) are located (i) in front of and either past, or (ii) within a range of pre-determined distances in front of the location of the autonomous vehicle.

Canvas algorithm for perception. In some embodiments, the long-distance perception system includes a canvas algorithm that fuses the vehicle detection outputs (from, for example, detection module 110 in FIG. 1) from different cameras or different crops of a single image, forming vehicle detection results on a unified virtual focal plane, which simplifies the processing of downstream modules. In an example, the vehicle detection algorithm outputs a bounding box, feature points, contour, lighting signals, vehicle classification and/or distance estimation of each visible vehicles in the photo.

Sensors for autonomous driving usually include cameras of different focal length pointing to the same direction (e.g., camera(s) 102 in FIG. 1). In an example, the vehicle detection algorithm will run on each camera photo separately. Each camera photo may have different regions of interest, so the vehicle detection algorithm may run on different crops of the original images separately. Therefore, there could be many separate vehicle detection results, processing whose interrelation could be burdensome for downstream systems.

However, since some of the cameras are pointing in the same general direction, are physically located close to each other, and have synchronized shutters, the captured images will satisfy some simple geometric transformations (e.g., projective transformations). The crops of an original image also satisfy the same family or geometric transformation. Therefore, using those geometric transformations, the vehicle detection outputs of different crops of different camera may be fused and unified vehicle detection results on a selected virtual focal plane be composed.

In an example, when fusing vehicle detection outputs, the field of view of each camera and each crop of photo must be considered, because one vehicle could be partially visible in some photo or crop of photo. In principle, visibility of each vehicle attribute in each output is inferred first, and then the unified vehicle attributes are predicted based on visibility, with conflictions properly flagged. Additional examples, which further elucidate embodiments of the disclosed technology are discussed in the next section.

Examples of Fusing Real-Time Image Feeds From On-Vehicle Cameras

Figure 2A:
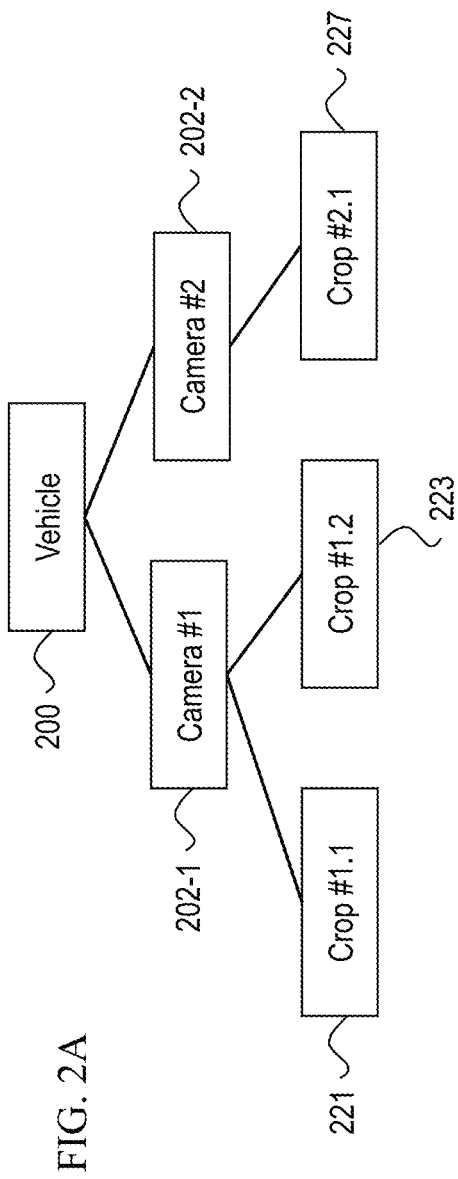
FIGS. 2A and 2B show an example of the pre-processing that generates inputs for the fusion of different scenes of real-time image feeds.
Figure 2B:
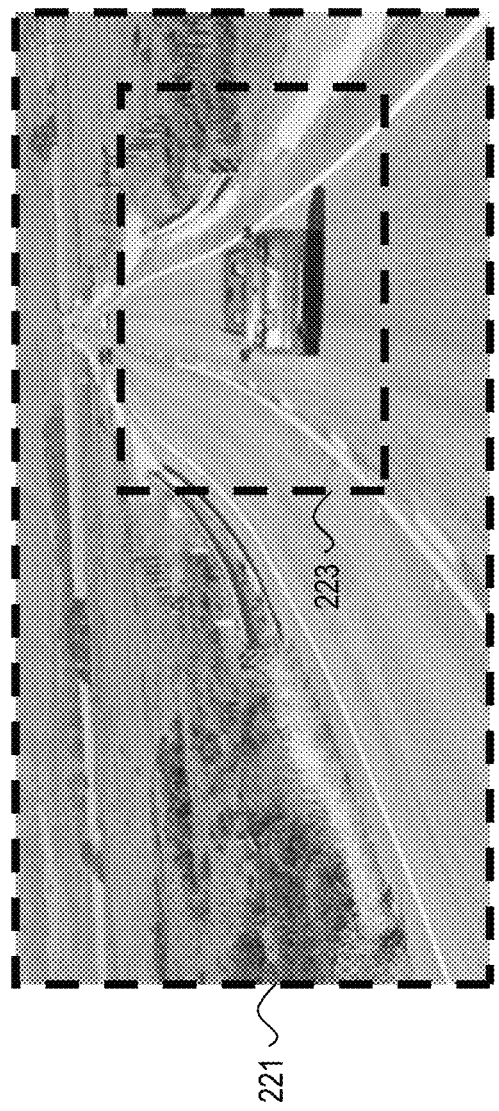

As discussed above, crops of one or images can be fused to eliminate any redundancy in the images, which advantageously ensures efficient processing for real-time autonomous operation. FIGS. 2A and 2B show an example of the pre-processing that generates inputs for the fusion of different scenes of real-time image feeds. As shown in FIG. 2A, and as described above, a vehicle 200 may include at least a first camera 202-1 and a second camera 202-2. In an example, the first camera 202-1 may capture one or images from which a first cropped image 221 and a second cropped image 223 may be generated. Similarly, the second camera may capture an image from which a cropped image 227 is generated.

In an example, the first and second cameras may be pointing in substantially the same direction, which may result in the cropped images (221, 223 and 227) including a common object, whose information can then be fused. For example, and as shown in FIG. 2B, the second cropped image 223 may be an inset picture (and thus a subset) of the first cropped image 221, and will include a common object. The output of the fusion of these cropped images will retain the information in the images, but will typically be of a smaller byte size than the sum of the byte sizes of the two cropped images.

Figure 3:
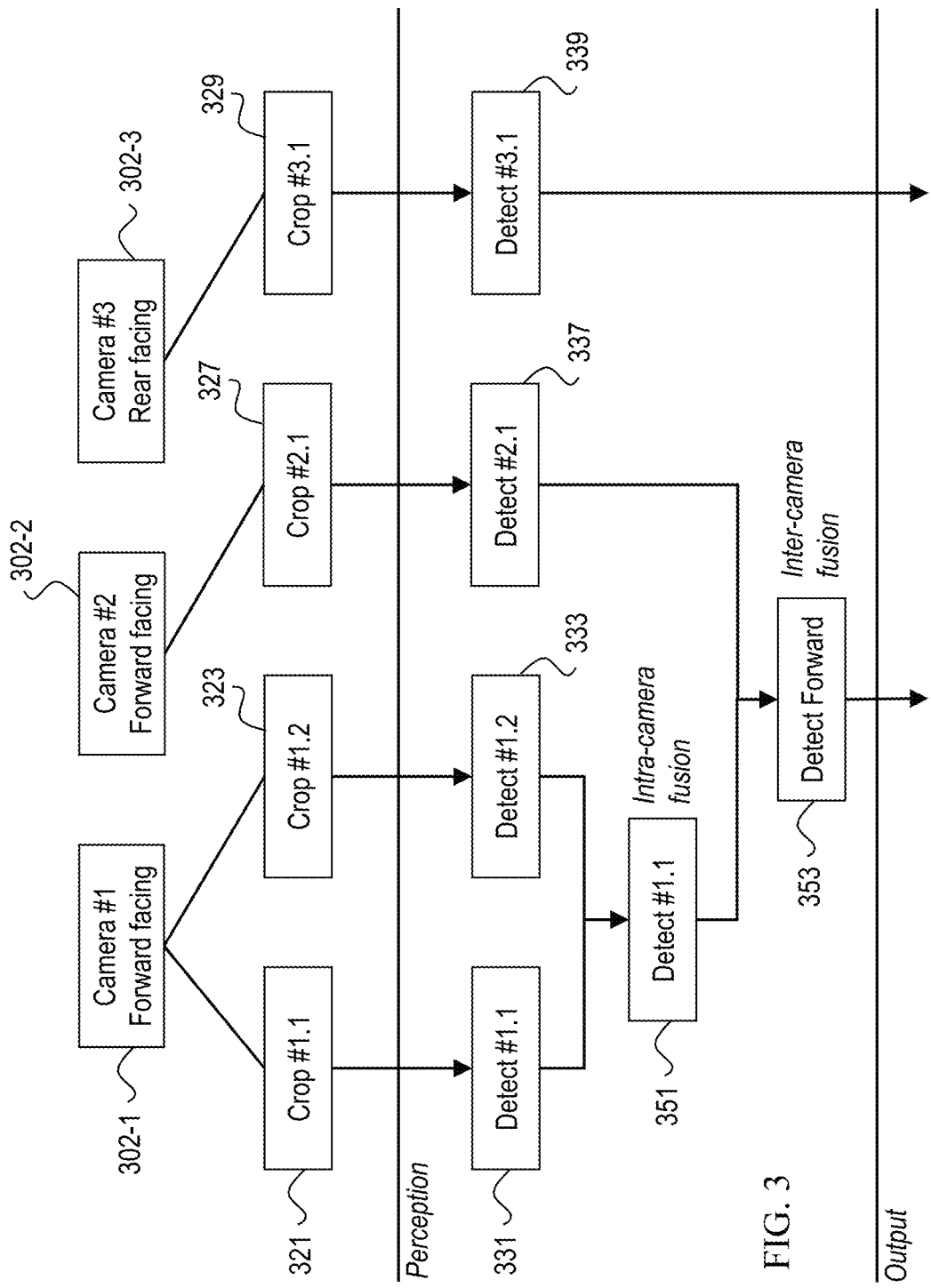
FIG. 3 shows an example of the workflow for the fusion of different scenes of real-time image feeds.

FIG. 3 shows an example of the workflow for the fusion of different scenes of real-time image feeds. As shown therein, and described in the context of FIG. 2A, multiple cameras (e.g., 302-1, 302-2 and 302-3) may be configured to capture images (not shown in FIG. 3), which are then cropped to generate a plurality of cropped images (e.g., 321, 323, 327, 329). For example, forward-facing camera #1 (302-1) captures images that result in cropped images 321 and 323, and forward-facing camera #2 (302-2) corresponds to another cropped image 327. In a similar manner, a rear-facing camera #3 (302-3) captures images that are cropped to generate an cropped image 329.

In some embodiments, the cropped images (e.g., 321, 323, 327 and 329) are processed by a detection module (e.g., detection module 110 in FIG. 1), which results in outputs (e.g., 331, 333, 337 and 339, respectively) that include the bounding boxes being used to identify objects in each of the cropped images. In an example, the objects that are detected may include vehicles (e.g., cars, trucks, motorcycles, etc.), pedestrians, and structures adjacent to roadways (e.g., signposts, fire hydrants, etc.).

In some embodiments, the bounding boxes in a cropped image may be associated with metadata that provides additional information corresponding to the objects detected in the cropped image. In an example, the metadata may include at least one of 2D or 3D detection results, a vehicle-type classification, a vehicle re-identification (e.g., a feature vector that includes the make, model and/or color of the vehicle), a taillight signal detection results and a vehicle segmentation mask (e.g., detailed contours of the vehicle).

In some embodiments, The metadata of the bounding boxes may be used to fuse the detection results for objects that are common amongst the cropped images. Embodiments of the disclosed technology provide methods for intra-camera fusion (e.g., fuse results from cropped images generated from images captured by a single camera) and inter-camera fusion (e.g., fuse results from cropped images generated from images captured from two or more cameras that are pointing in substantially the same direction).

Intra-camera fusion fuses results from cropped images generated from images captured by a single camera, and includes the steps of:
(i) Establishing a photometric correspondence between cropped images using cropping information (e.g., focal length of camera, which portion of image was cropped, etc.);
(ii) Match detection results for a common/identical vehicle across images; and
(iii) Fuse detection results of different types to generate an output 351.

Inter-camera fusion fuses results from cropped images generated from images captured from two or more cameras facing the same direction (e.g., forward-facing cameras #1 and #2 in FIG. 3), and includes the steps of:
(i) Establishing a photometric correspondence between cropped images using camera pose (e.g., based on calibrated camera position, focal length, etc.);
(ii) Match detection results for a common/identical vehicle across images; and
(iii) Fuse detection results of different types to generate an output 353.

In some embodiments, both intra-camera and inter-camera fusion compensate for the different fields-of-view in each of the cropped images, as well as the lack of consistent visibility in any set of cropped images. For example, only a portion of an object may be visible in one cropped image, and a different portion may be visible in another cropped image. Embodiments of the disclosed technology are advantageously able to integrate this information, thereby reducing any redundancy and ensuring real-time autonomous operation of the vehicle.

Figure 4A:
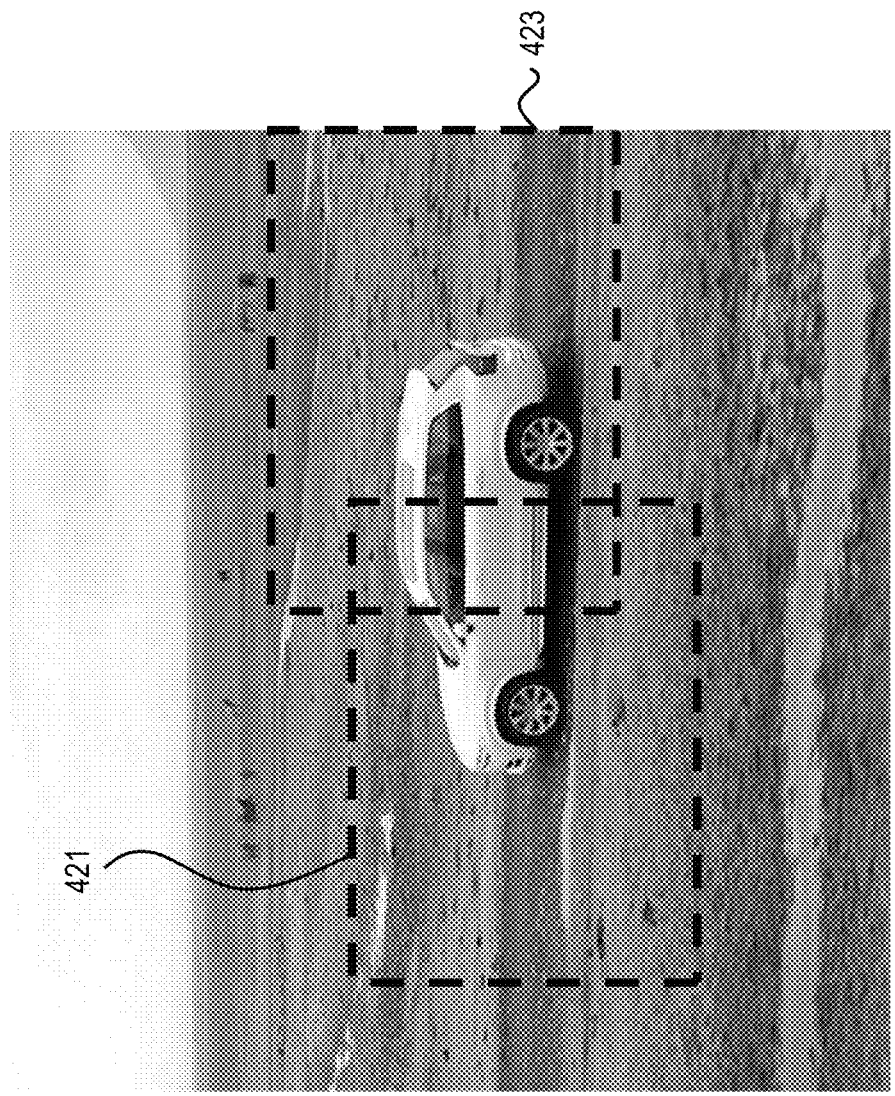
FIGS. 4A and 4B show an example of fusing two cropped images based on the detected characteristics of an object.
Figure 4B:
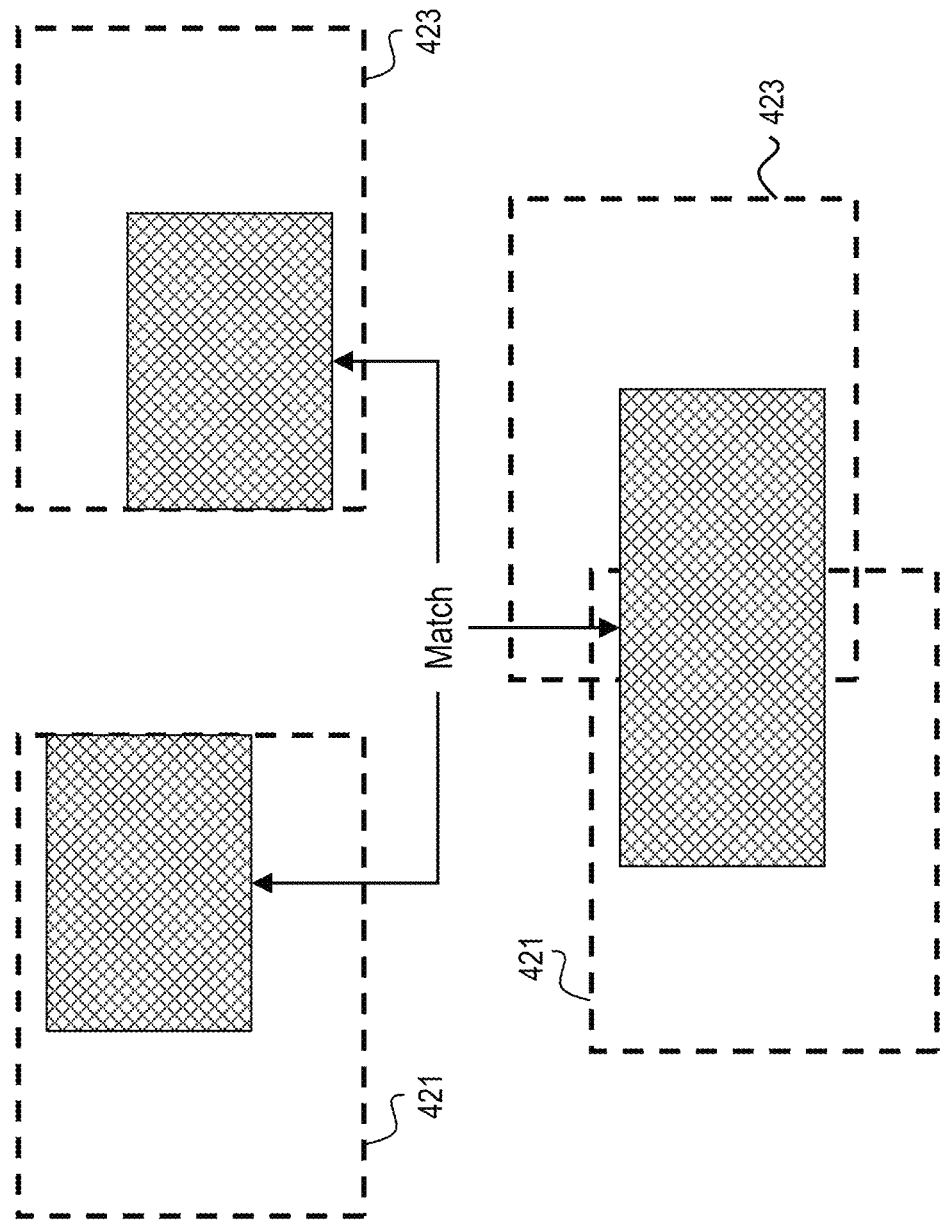

In some embodiments, different types of detection results, which are available in the metadata of the bounding boxes, may be fused. In an example, the different types of detection results include:
Multiple 2D bounding boxes, wherein the fused result includes the largest bounding box that covers the object of interest that is present in each of the bounding boxes
Multiple 3D bounding boxes, wherein the fused result includes an average of visible keypoints (e.g., a identifiable location in an image)
Vehicle type classification, wherein the fused result includes the most common (e.g., a majority vote) vehicle type classification amongst the input cropped images
Vehicle re-identification features, wherein the fused result includes the largest visible feature amongst the input cropped images
Taillight signal detection, wherein the fused result includes a majority vote across the input cropped images, accounting for visibility of the taillights
Vehicle segmentation mask, wherein the fused result includes the largest coverage (e.g. a convex hull) of all the input segmentation masks FIGS. 4A and 4B show an example of fusing two cropped images based on the detected characteristics of an object. As shown in FIG. 4A, a first cropped image 421 may include the front portion of a vehicle, whereas a second cropped image 423 may include the rear portion of the vehicle. Bounding boxes in the first and second cropped images are matched, as shown in FIG. 4B, based on, for example, (i) the re-identification vector in the metadata of the bounding boxes, which may include the make, model and color of the detected vehicle, and (ii) the segmentation mask, whose contours can be aligned. Having identified the common vehicle in the two cropped images, the results may be fused to generate the result shown in FIG. 4B.

Figure 5:
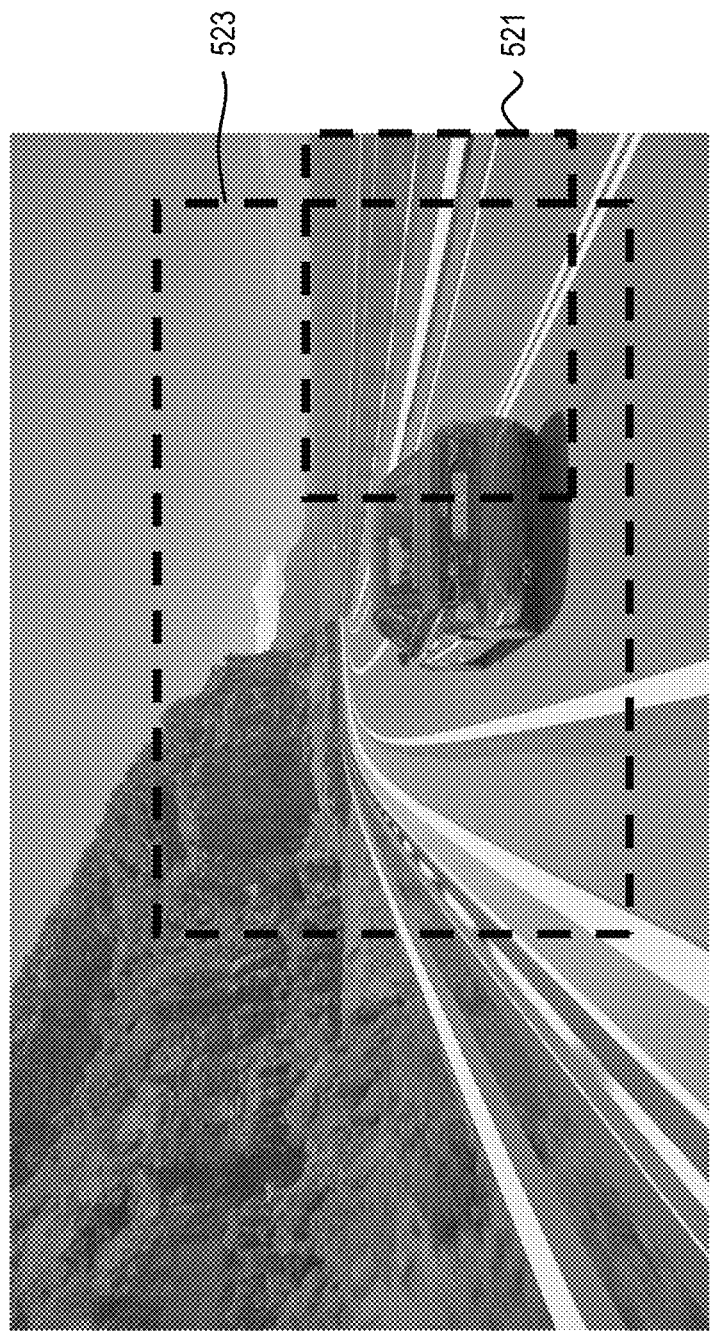
FIG. 5 shows another example of fusing two cropped images based on the detected characteristics of an object.

FIG. 5 shows another example of fusing two cropped images based on the detected characteristics of an object. A first cropped image 521 include the rear of a vehicle in which both the taillights of the vehicle are visible, whereas the second cropped image 523 includes a portion of the rear of the vehicle, in which only one of the taillights of the vehicle is visible. In an example, the taillight signal detection results may be as follows:

First cropped image 521 taillight detection
  Left: red lighted
  Right: red lighted
Second cropped image 523 taillight detection
  Left: unknown
  Right: red lighted Give these exemplary detection results, the majority vote that is performed as part of the fusion process results in a {Left: red lighted, Right: red lighted} output result for the taillight signal detection. This example illustrates the efficacy of the disclosed technology in that the information available in both the input cropped images is preserved in the output result, but the amount of data in the output result is less than that of the input. Embodiments of the disclosed technology are able to reduce the redundant information in multiple cropped images, thereby reducing the amount of information that needs to be processed by downstream modules, and advantageously improving autonomous vehicle operation.

Exemplary Embodiments of the Disclosed Technology

Figure 6:
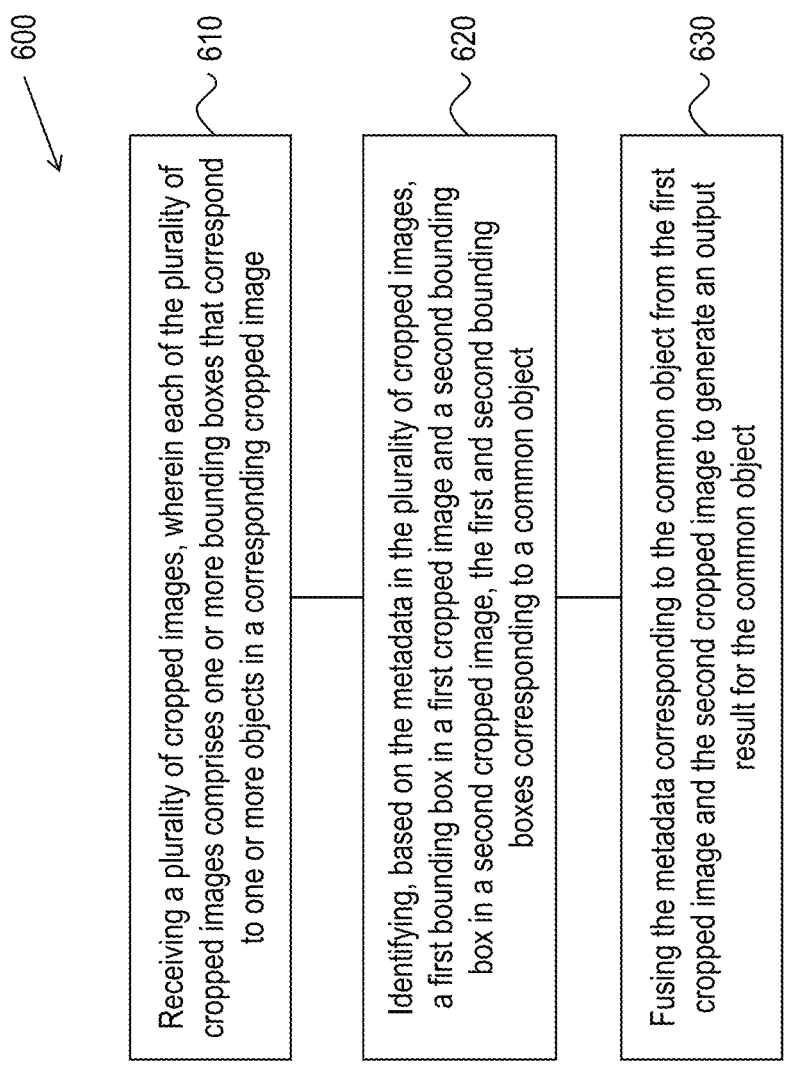
FIG. 6 shows a flowchart of an example method for improving perception in an autonomous vehicle, in accordance with embodiments of the disclosed technology.

FIG. 6 shows a flowchart for an example method 600 for improving perception in an autonomous vehicle. The method 600 includes, at step 610, receiving a plurality of cropped images, wherein each of the plurality of cropped images comprises one or more bounding boxes that correspond to one or more objects in a corresponding cropped image. In some embodiments, each of the one or more bounding boxes comprise metadata associated with a detection of the one or more objects.

The method 600 includes, at step 620, identifying, based on the metadata in the plurality of cropped images, a first bounding box in a first cropped image and a second bounding box in a second cropped image, the first and second bounding boxes corresponding to a common object.

The method 600 includes, at step 630, fusing the metadata corresponding to the common object from the first cropped image and the second cropped image to generate an output result for the common object.

In some embodiments, the common object is a vehicle, and the metadata of a bounding box comprises at least one of a vehicle feature vector, a taillight signal detection result or a vehicle segmentation mask corresponding to the vehicle detected in the first or the second bounding box. In an example, the metadata further comprises at least one of a camera pose, a focal length, a shutter speed or a field-of-view associated with a camera of the plurality of cameras that was a source for the cropped image. In another example, the vehicle feature vector comprises a color of the vehicle or a make of the vehicle. In yet another example, the vehicle segmentation mask comprises one or more contours of the vehicle.

In some embodiments, the plurality of cropped images is generated from one or more images captured by exactly one of the plurality of cameras.

In some embodiments, the plurality of cropped images is generated from one or more images captured by two of more of the plurality of cameras facing towards a substantially similar direction.

In some embodiments, the common object is a common vehicle, the first cropped image comprises a left taillight and a right taillight of the common vehicle, the second cropped image comprises exactly one taillight of the common vehicle, and the output result comprises a taillight signal detection that is a majority vote based on the left taillight, the right taillight and the exactly one taillight.

In some embodiments, the common object is a common vehicle, the first cropped image comprises a first vehicle segmentation mask corresponding to the common vehicle, the second cropped image comprises a second vehicle segmentation mask corresponding to the common vehicle, and the output result comprises a vehicle segmentation mask based on a convex combination of the first and second vehicle segmentation masks.

In some embodiments, a byte size of the output result is less than a byte size of the metadata corresponding to the common object from both the first and second cropped images.

Figure 7:
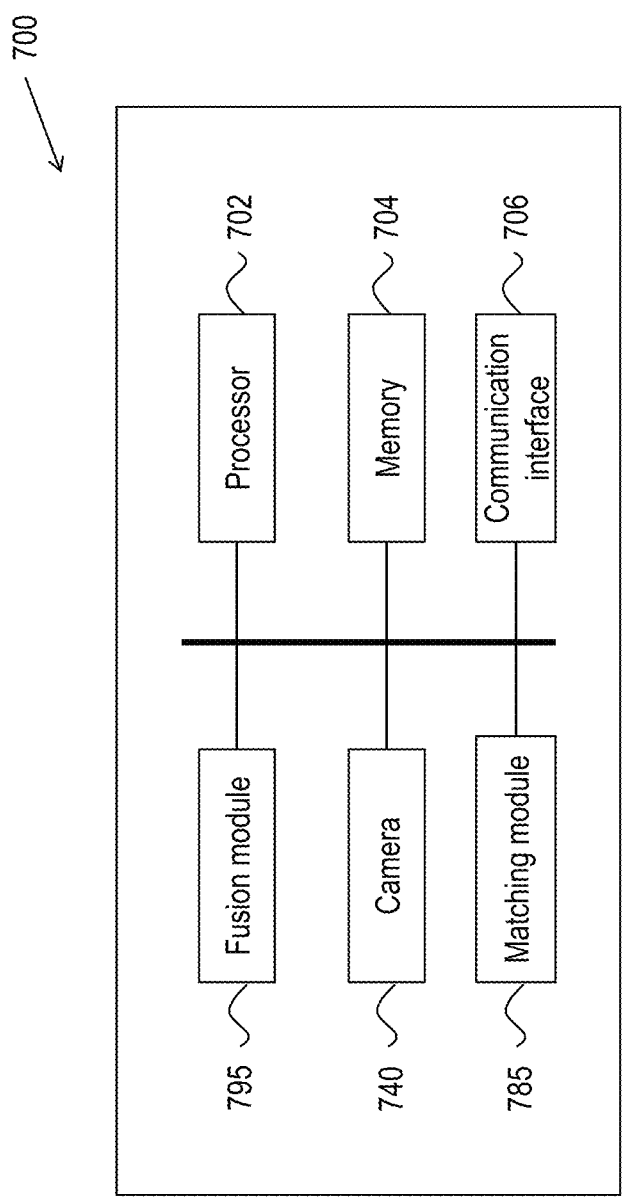
FIG. 7 shows an example of a hardware platform that can implement some techniques described in the present document.

FIG. 7 shows an example of a hardware platform 700 that can be used to implement some of the techniques described in the present document. For example, the hardware platform 700 may implement the method 600 or may implement the various modules described herein. The hardware platform 700 may include a processor 702 that can execute code to implement a method. The hardware platform 700 may include a memory 704 that may be used to store processor-executable code and/or store data. The hardware platform 700 may further include a communication interface 706. For example, the communication interface 706 may implement one or more of the communication protocols (LTE, Wi-Fi, and so on) described herein. The hardware platform may further include one or more cameras 740, a matching module 785 and a fusion module 795. In some embodiments, some portion or all of the matching module 785 and/or the fusion module 795 may be implemented in the processor 702.

Implementations of the subject matter and the functional operations described in this patent document can be implemented in various systems, digital electronic circuitry, or in computer software, firmware, or hardware, including the structures disclosed in this specification and their structural equivalents, or in combinations of one or more of them. Implementations of the subject matter described in this specification can be implemented as one or more computer program products, e.g., one or more modules of computer program instructions encoded on a tangible and non-transitory computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more of them. The term "data processing unit" or "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of nonvolatile memory, media and memory devices, including by way of example semiconductor memory devices, e.g., EPROM, EEPROM, and flash memory devices. The processor and the memory can be supplemented by, or incorporated in, special purpose logic circuitry.

While this patent document contains many specifics, these should not be construed as limitations on the scope of any invention or of what may be claimed, but rather as descriptions of features that may be specific to particular embodiments of particular inventions. Certain features that are described in this patent document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in this patent document should not be understood as requiring such separation in all embodiments.

Only a few implementations and examples are described and other implementations, enhancements and variations can be made based on what is described and illustrated in this patent document.

What is claimed is:

1. A method implemented in an autonomous vehicle comprising a plurality of cameras, the method implemented by a processor disposed in the autonomous vehicle and comprising:

receiving a plurality of cropped images from the plurality of cameras in communication with the processor disposed in the autonomous vehicle;

processing the plurality of cropped images by applying a vehicle detection algorithm implemented in the processor disposed in the autonomous vehicle to provide detection outputs having a unified focal plane, wherein the detection outputs include a first cropped image including a first bounding box and a second cropped image including a second bounding box and wherein the first bounding box and the second bounding box comprise metadata associated with a detection of one or more objects;

identifying, based on the metadata in the first cropped image and the second cropped image, a common object in each of the first bounding box in the first cropped image and the second bounding box in the second cropped image; and fusing the first cropped image and the second cropped image to generate an output result for the common object based on characteristics of the common object.

2. The method of claim 1, wherein the common object is a vehicle, and wherein the metadata of a bounding box comprises at least one of a vehicle feature vector, a taillight signal detection result or a vehicle segmentation mask corresponding to the vehicle detected in the first or the second bounding box.

3. The method of claim 2, wherein the metadata further comprises at least one of a camera pose, a focal length, a shutter speed or a field-of-view associated with a camera of the plurality of cameras that was a source for the cropped image.

4. The method of claim 2, wherein the vehicle feature vector comprises a color of the vehicle or a make of the vehicle.

5. The method of claim 2, wherein the vehicle segmentation mask comprises one or more contours of the vehicle.

6. The method of claim 1, wherein the plurality of cropped images is generated from one or more images captured by exactly one of the plurality of cameras.

7. The method of claim 1, wherein the plurality of cropped images is generated from one or more images captured by two of more of the plurality of cameras facing towards a substantially similar direction.

8. The method of claim 1, wherein the common object is a common vehicle, wherein the first cropped image comprises a left taillight and a right taillight of the common vehicle, wherein the second cropped image comprises exactly one taillight of the common vehicle, and wherein the output result comprises a taillight signal detection that is a majority vote based on the left taillight, the right taillight and the exactly one taillight.

9. The method of claim 1, wherein the common object is a common vehicle, wherein the first cropped image comprises a first vehicle segmentation mask corresponding to the common vehicle, wherein the second cropped image comprises a second vehicle segmentation mask corresponding to the common vehicle, and wherein the output result comprises a vehicle segmentation mask based on a convex combination of the first and second vehicle segmentation masks.

10. An apparatus implemented in an autonomous vehicle, comprising:
a plurality of cameras;
a processor; and
a non-transitory memory with instructions thereon,
wherein a plurality of cropped images is generated from one or more images captured by at least one of the plurality of cameras in communication with the processor disposed in the autonomous vehicle, each cropped image comprising one or more bounding boxes that correspond to one or more objects in a corresponding cropped image,
wherein the instructions upon execution by the processor cause the processor to:
process the plurality of cropped images by applying a vehicle detection algorithm implemented in the processor included in the autonomous vehicle to provide detection outputs having a unified focal plane, wherein the detection outputs include a first cropped image including a first bounding box and a second cropped image including a second bounding box, and wherein the first bounding box and the second bounding box comprise metadata associated with a detection of one or more objects;
identify, based on metadata associated with the first and second bounding boxes, a common object in each of the first bounding box in the first cropped image and the second bounding box in the second cropped image, wherein the first and second bounding boxes correspond to a common object;
fuse the first cropped image and the second cropped image to generate an output result for the common object based on characteristics of the common object, and
wherein a byte size of the output result is less than a byte size of the metadata corresponding to the common object from both the first and second cropped images.

11. The apparatus of claim 10, wherein the plurality of cropped images is generated from one or more images captured by exactly one of the plurality of cameras.

12. The apparatus of claim 10, wherein the plurality of cropped images is generated from one or more images captured by two of more of the plurality of cameras facing towards a substantially similar direction.

13. The apparatus of claim 10, wherein the common object is a vehicle, and wherein the metadata of a bounding box comprises at least one of a vehicle feature vector, a taillight signal detection result or a vehicle segmentation mask corresponding to the vehicle detected in the bounding box.

14. A computer program product stored on a non-transitory computer readable media, the computer program product including program code for carrying out a method implemented by a processor disposed in in an autonomous vehicle, the method comprising:
receiving a plurality of cropped images from the plurality of cameras in communication with the processor disposed in the autonomous vehicle;
processing the plurality of cropped images by applying a vehicle detection algorithm implemented in the processor disposed in the autonomous vehicle to provide detection outputs having a unified focal plane, wherein the detection outputs include a first cropped image including a first bounding box and a second cropped image including a second bounding box and wherein the first bounding and the second bounding box comprise metadata associated with a detection of one or more objects;
identifying, based on the metadata in the first cropped image and the second cropped image, a common object in each of the first bounding box in the first cropped image and the second bounding box in the second cropped image; and
fusing the first cropped image and the second cropped image to generate an output result for the common object based on characteristics of the common object.

15. The computer program product of claim 14, wherein the common object is a vehicle, and wherein the metadata of a bounding box comprises at least one of a vehicle feature vector, a taillight signal detection result or a vehicle segmentation mask corresponding to the vehicle detected in the bounding box.

16. The computer program product of claim 15, wherein the metadata further comprises at least one of a camera pose, a focal length, a shutter speed or a field-of-view associated with a camera of the plurality of cameras that was a source for the cropped image.

17. The computer program product of claim 15, wherein the vehicle feature vector comprises a color of the vehicle or a make of the vehicle.

18. The computer program product of claim 15, wherein the vehicle segmentation mask comprises one or more contours of the vehicle.

19. The computer program product of claim 14, wherein the plurality of cropped images is generated from one or more images captured by exactly one of the plurality of cameras.

20. The computer program product of claim 14, wherein the plurality of cropped images is generated from one or more images captured by two of more of the plurality of cameras facing towards a substantially similar direction.

* * * * *